United States Patent
Tsirkin et al.

(10) Patent No.: US 9,141,434 B2
(45) Date of Patent: Sep. 22, 2015

(54) ROBUST NON-SHAREABLE RESOURCE ACCESS UNDER LIVE VIRTUAL MACHINE CLONING

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 307 days.

(21) Appl. No.: 13/484,180

(22) Filed: May 30, 2012

(65) Prior Publication Data

US 2013/0326509 A1    Dec. 5, 2013

(51) Int. Cl.
*G06F 9/455* (2006.01)
*G06F 9/50* (2006.01)

(52) U.S. Cl.
CPC .................................. *G06F 9/5077* (2013.01)

(58) Field of Classification Search
None
See application file for complete search history.

(56) References Cited

U.S. PATENT DOCUMENTS

| | | | | |
|---|---|---|---|---|
| 5,901,312 A * | 5/1999 | Radko | | 718/104 |
| 5,937,199 A * | 8/1999 | Temple | | 710/262 |
| 8,151,263 B1 * | 4/2012 | Venkitachalam et al. | | 718/1 |
| 8,407,701 B2 * | 3/2013 | Gaertner et al. | | 718/1 |
| 8,504,749 B2 * | 8/2013 | Stellwag | | 710/200 |
| 8,775,282 B1 * | 7/2014 | Ward et al. | | 705/34 |
| 2004/0221290 A1 * | 11/2004 | Casey et al. | | 718/104 |
| 2011/0117962 A1 * | 5/2011 | Qiu et al. | | 455/558 |
| 2012/0110574 A1 * | 5/2012 | Kumar | | 718/1 |
| 2013/0091568 A1 * | 4/2013 | Sharif et al. | | 726/22 |

* cited by examiner

*Primary Examiner* — Meng An
*Assistant Examiner* — Dar-Eaum Nam
(74) *Attorney, Agent, or Firm* — Lowenstein Sandler LLP

(57) ABSTRACT

A system and method are disclosed for preventing concurrent access by a virtual machine and a clone of the virtual machine to a resource in a non-shareable state. In accordance with one embodiment, a hypervisor receives a command to clone a virtual machine, and determines whether any resource used by the virtual machine is in a non-shareable state (e.g., the virtual machine holds a lock on a resource, a resource comprises memory that stores secure data, etc.). When any resource used by the virtual machine is in a non-shareable state, the hypervisor delays cloning of the virtual machine until all resources used by the virtual machine are in a shareable state.

15 Claims, 3 Drawing Sheets

ROBUST NON-SHAREABLE RESOURCE ACCESS UNDER LIVE VIRTUAL MACHINE CLONING

TECHNICAL FIELD

This disclosure relates to computer systems, and more particularly, to cloning of virtual machines in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, a hard disk, a solid-state drive, etc.). The hypervisor manages these mappings in a transparent fashion, thereby enabling the guest operating system and applications executing on the virtual machine to interact with the virtual processors and virtual devices as though they were actual physical entities.

Typically, a hypervisor enables the cloning of virtual machines via one of two techniques: via a direct-copy command, and via a copy-on-write command. In direct-copy, a source virtual machine is cloned by allocating and creating a new destination virtual machine that is an exact replica of the source virtual machine. In copy-on-write, a source virtual machine is cloned by creating a new pointer to the source virtual machine, so no new virtual machine is created. The term "live cloning" refers to a hypervisor feature where a virtual machine can be cloned while the virtual machine is executing, without requiring any downtime for the virtual machine.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
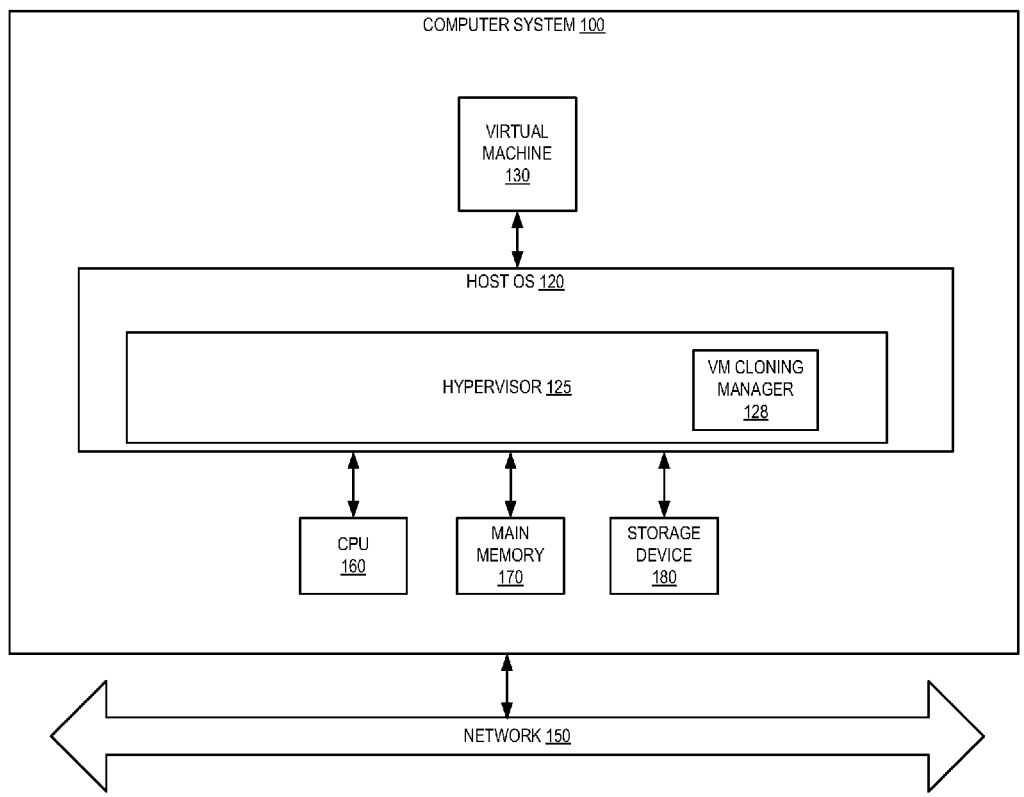
FIG. 1 depicts an exemplary computer system architecture, in accordance with an embodiment of the present invention.

Described herein is a system and method for handling live cloning of virtual machines. When a virtual machine is using a resource (e.g., a file, an application, a memory, a device, etc.) that is in a non-shareable state (e.g., due to the virtual machine holding a lock on the resource, due to the resource containing secure data, etc.), then if the virtual machine is cloned, both the virtual machine and its clone may concurrently access the non-shareable resource. For example, if a virtual machine holding a lock on a file is cloned, then the clone will also hold its own lock on the file, and the classic problem of concurrent writes to the file may thus occur. Embodiments of the invention prevent such problems from occurring. More particularly, in accordance with one embodiment, when a hypervisor receives a command to clone a virtual machine, the hypervisor determines whether any of the resources used by the virtual machine is in a non-shareable state. When any resource used by the virtual machine is in a non-shareable state, the hypervisor delays cloning of the virtual machine until all resources used by the virtual machine are in a shareable state. Embodiments of the present disclosure are thus capable of preventing concurrent access to resources in a non-shareable state.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "cloning", "blocking", "delaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which is software that manages the hardware resources of the computer system and that provides functions such as interprocess communication, scheduling, virtual memory management, and so forth. In one embodiment, host operating system 120 also comprises a hypervisor 125, which is software that provides a virtual operating platform for one or more virtual machines 130 and that manages execution of one or more virtual machines 130. In accordance with this embodiment, hypervisor 125 includes a VM cloning manager 128 that is capable of determining when live cloning of a VM should be delayed, due to the VM using a resource that is in a non-shareable state, as described below with respect to FIG. 2. It should be noted that in some alternative embodiments, hypervisor 125 may be external to host OS 120, rather than embedded within host OS 120.

Virtual machine 130 is a software implementation of a machine that executes programs as though it were an actual physical machine. Virtual machine 130 comprises a guest operating system that manages the execution of programs within the virtual machine, as well as one or more virtual processors that are mapped by hypervisor 125 to physical CPU(s) 160 of computer system 100. It should be noted that although, for simplicity, a single virtual machine is depicted in FIG. 1, in some other embodiments computer system 100 may host a plurality of virtual machines.

Figure 2:
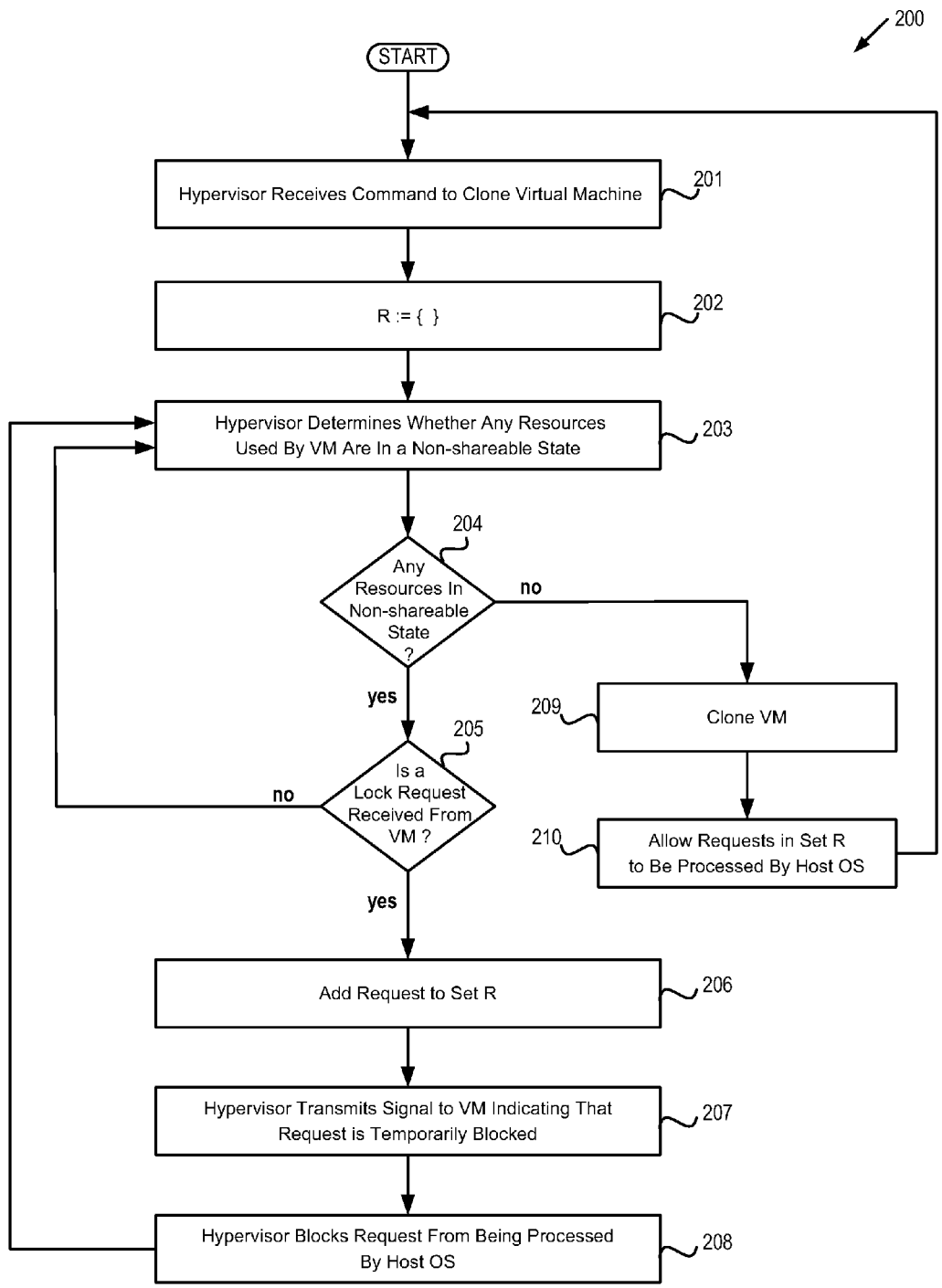
FIG. 2 depicts a flow diagram of one embodiment of a method for handling live cloning of a virtual machine.

FIG. 2 depicts a flow diagram of one embodiment of a method 200 for handling live cloning of a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 (e.g., VM cloning manager 128 of hypervisor 125) of FIG. 1, while in some other embodiments, some or all of the method might be performed by another machine. It should be noted that blocks depicted in FIG. 2 can be performed simultaneously or in a different order than that depicted.

At block 201, hypervisor 125 receives a command to clone virtual machine 130. The command may be issued by a human administrator, or by a program executed by host OS 120, and may be issued for a variety of reasons (e.g., to create a virtual test environment of virtual machine 130, to reproduce an issue or exception that has occurred in virtual machine 130, for live migration to another host, etc.). Further, the command may be either a direct-copy command, or a copy-on-write command. In one embodiment, the command is received by VM cloning manager 128 of hypervisor 125.

At block 202, a set R, which will be used to keep track of requests by VM 130 to obtain a lock on a resource, is initialized to an empty set. At block 203, hypervisor 125 determines whether any resources used by VM 130 are in a non-shareable state (e.g., VM 130 holds a lock on a resource, a resource contains secure data, etc.). If the determination is affirmative, method 200 proceeds to block 205, otherwise execution continues at block 209. In one embodiment, block 202 is performed by VM cloning manager 128 of hypervisor 125.

Block 205 branches based on whether a request by VM 130 to obtain a lock on a resource is received. If so, execution proceeds to block 206, otherwise execution continues back at block 203. Note that when block 205 is reached, VM 130 might already hold one or more locks on one or more resources, or might not hold any locks (e.g., if block 205 was reached because a resource contains secure data, rather than a lock held on a resource). Moreover, when VM 130 comprises a plurality of virtual processors, a lock on a resource might already be held by a first virtual processor of VM 130, while the request at block 205 might be received from a second virtual processor of VM 130 to obtain a lock on a different resource.

At block 206, the request received at block 206 is added to set R. In one embodiment, block 206 is performed by VM cloning manager 128 of hypervisor 125.

At block 207, hypervisor 125 transmits a signal to VM 130 indicating that the lock request is temporarily blocked. In some embodiments, the signal might also indicate that the request will be blocked until VM 130 is cloned, while in some other embodiments the signal might also indicate that the request will be blocked until VM 130 releases all of its locks (when applicable), or until the secure data is deleted or overwritten with non-secure data (when applicable). In one embodiment, block 206 is performed by VM cloning manager 128 of hypervisor 125. It should be noted that the particular information communicated to VM 130 by the signal is an implementation choice, and in some embodiments may be hard-coded (e.g., into VM cloning manager 128, etc.), while in some other embodiments may be selected via a configuration parameter or file by an administrator.

At block 208, hypervisor 125 blocks the lock request from reaching and being processed by host operating system 120, as there is at least one resource used by VM 130 in a non-shareable state (block 208 is reached only when the 'yes' branch of block 204 is taken). After block 208, execution continues back at block 203. In one embodiment, block 208 is performed by VM cloning manager 128 of hypervisor 125.

At block 209, hypervisor 125 clones VM 130. At block 210, hypervisor 125 allows the lock requests in set R (which have been delayed via the blocking at block 208) to be processed by host operating system 120. In one embodiment, block 210 is performed by VM cloning manager 128 of hypervisor 125. After block 210, execution continues back at block 201.

Figure 3:
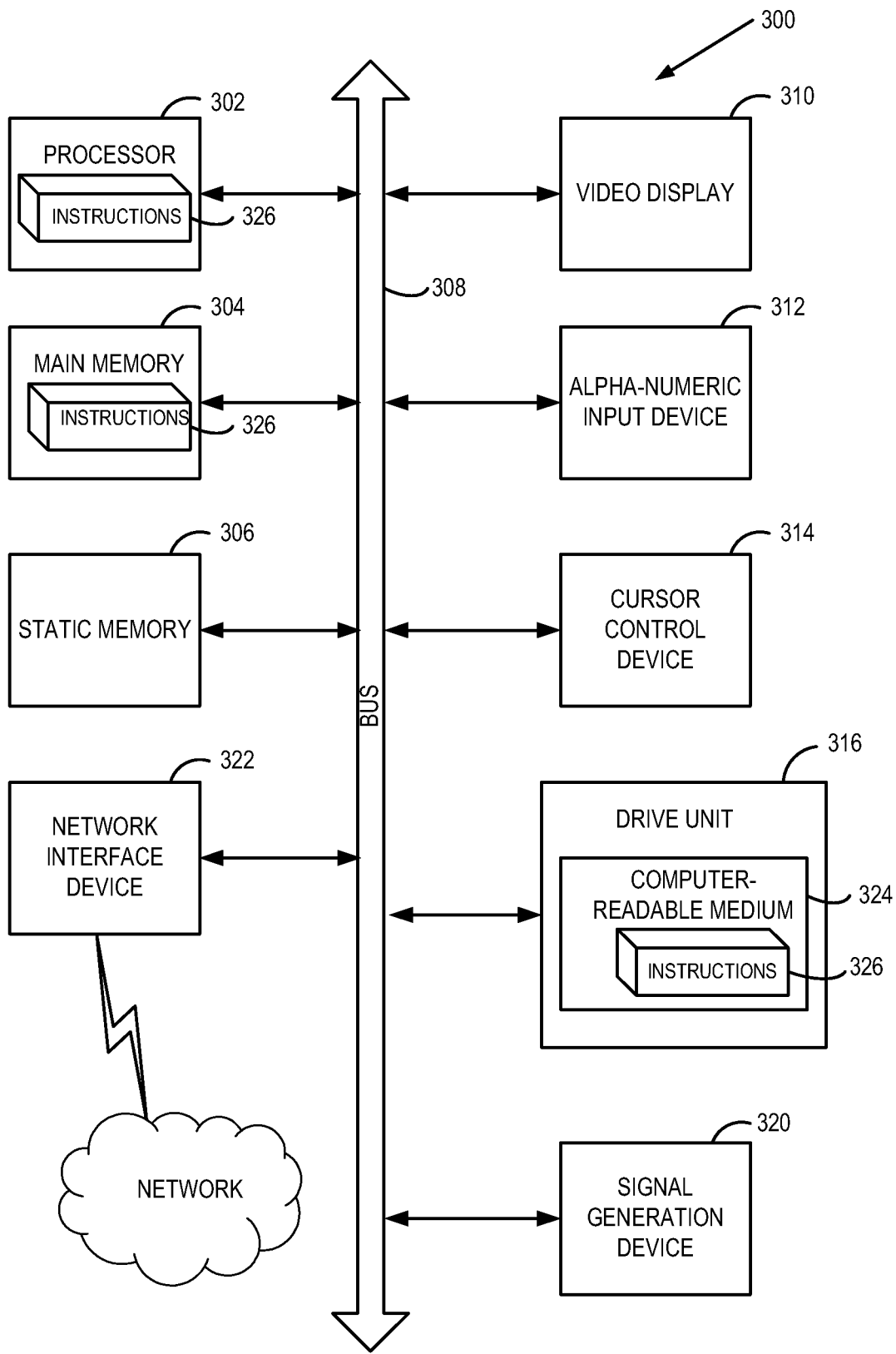
FIG. 3 depicts a block diagram of an illustrative computer system operating in accordance with embodiments of the invention.

FIG. 3 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a hypervisor executed by a processor, a command to clone a virtual machine, the virtual machine using a plurality of resources;
determining, by the hypervisor, whether any of the plurality of resources used by the virtual machine is in a non-shareable state indicative that at least one of the virtual machine holds a lock on any of the plurality of resources or any of the plurality of resources contains secure data, wherein the plurality of resources comprise at least one of a virtual resource or a physical resource;
delaying, by the hypervisor, cloning of the virtual machine if any of the plurality of resources used by the virtual machine is in the non-shareable state, until the plurality of resources used by the virtual machine are in a shareable state indicative that at least one of the virtual machine released all locks on the plurality of resources or the plurality of resources contains only non-secure data; and blocking, during the delaying and until after the cloning, a request to obtain a new lock on the plurality of resources.

2. The method of claim 1 wherein the command to clone the virtual machine is a direct-copy command.

3. The method of claim 1 wherein the processor comprises a host operating system, the method further comprising:
receiving, at the hypervisor during the delaying, the request from the virtual machine to obtain the new lock on the plurality of resources; and
blocking, by the hypervisor, the request from being processed by the host operating system until after the cloning.

4. The method of claim 3 wherein the virtual machine comprises a first virtual processor and a second virtual processor, and wherein the first virtual processor holds a lock on a first resource of the plurality of resources, and wherein the request is received from the second virtual processor for obtaining the new lock on a second resource of the plurality of resources.

5. The method of claim 3 further comprising transmitting to the virtual machine, by the hypervisor, a signal indicating the request is temporarily blocked.

6. The method of claim 1 wherein a resource of the plurality of resources comprises at least one of a file, an application, a memory, or a device.

7. An apparatus comprising:
a memory; and
a processor to:
execute a hypervisor and a virtual machine,
receive, by the hypervisor, a command to clone the virtual machine, the virtual machine using a plurality of resources,
determine, by the hypervisor, whether any of the plurality of resources used by the virtual machine is in a non-shareable state indicative that at least one of the virtual machine holds a lock on any of the plurality of resources or any of the plurality of resources contains secure data, wherein the plurality of resources comprise at least one of a virtual resource or a physical resource,
delay, by the hypervisor, cloning of the virtual machine if any of the plurality of resources used by the virtual machine is in the non-shareable state, until the plurality of resources used by the virtual machine are in a shareable state indicative that at least one of the virtual machine released all locks on the plurality of resources or the plurality of resources contains only non-secure data; and
block, during the delay and until after the cloning, a request to obtain a new lock on the plurality of resources.

8. The apparatus of claim 7 wherein the command to clone the virtual machine is a copy-on-write command.

9. The apparatus of claim 7 wherein the processor is also to:
execute a host operating system,
receive, at the hypervisor during the delaying, a request from the virtual machine to obtain the new lock on the plurality of resources, and
block, by the hypervisor, the request from being processed by the host operating system until after the cloning.

10. The apparatus of claim 9 wherein the virtual machine comprises a first virtual processor and a second virtual processor, and wherein the first virtual processor holds a first lock on a first resource of the plurality of resources, and wherein the request is received from the second virtual processor for obtaining the new lock on a second resource of the plurality of resources.

11. The apparatus of claim 9 further comprising transmitting to the virtual machine, by the hypervisor, a signal indicating the request is temporarily blocked.

12. A non-transitory computer readable storage medium, having instructions stored therein, which when executed, cause a processor to:
receive, by a hypervisor executed by the processor, a command to clone a virtual machine, the virtual machine using a plurality of resources;
determine, by the hypervisor, whether any of the plurality of resources used by the virtual machine is in a non-shareable state indicative that at least one of the virtual machine holds a lock on any of the plurality of resources or any of the plurality of resources contains secure data, wherein the plurality of resources comprise at least one of a virtual resource or a physical resource;
delay, by the hypervisor, cloning of the virtual machine if any of the plurality of resources used by the virtual machine is in the non-shareable state, until the plurality of resources used by the virtual machine are in a shareable state indicative that at least one of the virtual machine release all the locks on the plurality of resources or the plurality of resources contain only non-secure data; and
blocking, during the delaying and until after the cloning, a request to obtain a new lock on the plurality of resources.

13. The non-transitory computer readable storage medium of claim 12 wherein the processor executes a host operating system, and wherein the processor further to:
receive, at the hypervisor during the delaying, a request from the virtual machine to obtain the new lock on the plurality of resources; and
block, by the hypervisor, the request from being processed by the host operating system until after the cloning.

14. The non-transitory computer readable storage medium of claim 13 wherein the virtual machine comprises a first virtual processor and a second virtual processor, and wherein the first virtual processor holds a first lock on a first resource of the plurality of resources, and wherein the request is received from the second virtual processor for obtaining the new lock on a second resource of the plurality of resources.

15. The non-transitory computer readable storage medium of claim 13 wherein the processor is further to transmit to the virtual machine, by the hypervisor, a signal indicating the request is temporarily blocked.

* * * * *